United States Patent Office 2,867,564
Patented Jan. 6, 1959

2,867,564

HALOGENATED BICYCLOHEPTENYL SULFITE DERIVATIVES

Sidney B. Richter, Chicago, Ill., assignor to Velsicol Chemical Corporation, Chicago, Ill., a corporation of Illinois No Drawing. Application March 20, 1957
Serial No. 647,196

8 Claims. (Cl. 167—30)

This invention relates to new compositions of matter which are useful for the control of insect and mite pests. The new compounds of this invention contain the organic sulfite group along with halogen and carbon atoms in such combination which has been found to impart to these compounds distinct toxic activity on insect and mite pests.

More particularly, this invention relates to organic sulfites which contain a halogenated alkyl group and a halogenated, unsaturated bicyclic ring system joined to the sulfite group via a straight chain of $CH_2$ groups.

The new compounds of this invention can be represented by the general formula

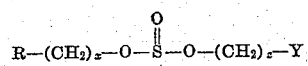

wherein R is a bicycloheptenyl radical containing from 4 to 6 halogen atoms, $x$ is an integer from 1 to 4, $z$ is an integer from 2 to 4, and Y is halogen.

These halogenated organic sulfites are prepared conveniently by a two-step condensation of thionyl chloride with the particular alcohols selected to give the desired final products. Thus an alcohol $Y(CH_2)_zOH$ is reacted with $SOCl_2$ to give the halogenated sulfinate

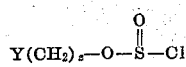

which is then reacted with an alcohol of the general formula $R—(CH_2)_x—OH$, wherein Y, R, $x$ and $z$ are as defined above. Since free hydrogen chloride is released in both of the above reactions, it may be desirable to effect the reactions in the presence of an acid scavenger such as pyridine or its derivatives. These scavengers serve to remove the free hydrogen chloride from the reaction medium as it is formed. The reactions can be carried out within a wide range of temperatures. Reaction temperatures between 15° C. and 60° C. are preferred, although lower or higher temperatures than these can be used, because the precise temperature is not critical. Solvents such as benzene or xylene can be used to facilitate the reaction.

The halogenated, unsaturated bicyclic alcohols which are used as starting materials in the preparation of the compounds of this invention can be obtained by the Diels-Alder condensation of halogenated cyclopentadienes with unsaturated alcohols in the known manner. Thus the Diels-Alder condensation of hexachlorocyclopentadiene with allyl alcohol has been described by E. K. Fields in the Journal of the American Chemical Society, volume 76, 1954, p. 2709. Other halogenated, unsaturated bicyclic alcohols which are suitable as starting materials for the preparation of the compositions of this invention are, for examples, the Diels-Alder condensation products from pentachlorocyclopentadiene and allyl alcohol, tetrachlorocyclopentadiene and 3-buten-1-ol, hexabromocyclopentadiene and 4-penten-1-ol, and others. These products are obtained easily and in excellent yields, as is illustrated by the 98% yield of product obtained by E. K. Fields from hexachlorocyclopentadiene and allyl alcohol.

The compounds of this invention are distinguished by their utility as insecticides and miticides. A wide variety of insects and mites which are economically destructive to crops can be controlled by means of the halogenated sulfites of the present invention. Thus, for example, insecticide test experiments were carried out in which the product of Example II below, namely 2-chloroethyl-(2,3,4,5,-7,7-hexachlorobicyclo (2.2.1)-3-heptenyl) methyl sulfite, was formulated as a 10% wettable powder and dispersed in water to give a 0.4% concentration of this compound. Cranberry bean plants were dipped in this toxic dispersion, dried, and caged with 3rd instar Mexican bean beetles (Epilachna varivestis). Within 48 hours after the treatment, all of the beetles in the cages containing cranberry bean plants treated with the product of Example II were dead, while all the beetles in an untreated control were still alive. In addition, feeding by the beetles was noted on all the plants in the untreated control, while feeding on only 2.0% of the plants treated with the product of Example II was observed. Even when the concentration of active toxicant was reduced by half to 0.2%, a 90% mortality of Mexican bean beetles was observed within 48 hours. This same compound was also toxic to the southern armyworm (Prodenia eridania) in similar experiments.

The compounds of this invention are particularly effective for controlling various species of mites, which are often seriously destructive to commercial crops and are at the same time very difficult to control. We have carried out experiments in which 2-chloroethyl-(2,3,4,5,-7,7-hexachlorobicyclo (2.2.1)-3-heptenyl)methyl sulfite was prepared as a 0.1% dispersion in water from a 10% wettable powder. When cranberry bean plants heavily infested with adults of the two-spotted spider mite (Tetranychus bimaculatus) were dipped in this dispersion and then caged, a 100% mortality of the mites was observed within 72 hours after treatment. All the mites were still alive at the end of this time in an untreated control. No damage to the host plants was noted during the course of these experiments. Halogenated insecticides have not been successful in controlling mites, and phosphate insecticides have resulted in resistance to mites. Therefore these new sulfite compounds are of especial importance.

The compounds of this invention can be prepared for practical use in pest control in the usual ways recognized in this field. Thus, they may be applied to crops in the form of sprays which are prepared by dissolving the compounds in organic solvents such as kerosene or the methylated naphthalenes, or by adding emulsifiers and preparing emulsions by dilution with water to the desired concentrations, or by mixing the compounds with wetting agents and preparing suitable suspensions by the addition of water. Similarly they can be applied to crops in the form of dusts which are prepared by mixing the active compounds intimately with inert materials such as talc or clays. If necessary, such substances as activators, adhesives, spreaders, and synergists can be added to these formulations.

The following examples illustrate the manner in which the compounds of this invention can be prepared and formulated for practical use, but it is obvious that the scope of this invention is not limited by the particular compounds cited in these examples.

EXAMPLE I

*Preparation of 2-chloroethyl chlorosulfinate*

Thionyl chloride (70 g.) was added over a period of about 6 hours to 40 g. of ethylene chlorohydrin in a 250 ml. round-bottomed flask protected with a calcium chloride drying tube. The addition was made at such a rate that the temperature did not rise above 35° during the addition process. The product was distilled to give 76 g. of 2-chloroethyl chlorosulfinate boiling at 84 to 86° under 25 mm. pressure.

EXAMPLE II

*Preparation of 2-chloroethyl-(2,3,4,5,7,7-hexachlorobicyclo (2.2.1)-3-heptenyl)methyl sulfite*

The addition product (66.2 g., 0.2 mol.) from hexachlorocyclopentadiene and allyl alcohol prepared as described to E. K. Fields (J. Am. Chem. Soc., 76, 2709 (1954)) was added to 250 ml. of benzene in a 500 ml. round-bottomed flask fitted with a mechanical stirrer, thermometer, and addition funnel. Pyridine (16 g., 0.2 mol.) was added all at once to the mixture in the flask. 2-chloroethyl chlorosulfinate (32.6 g., 0.2 mol.) prepared as described in Example I was then added dropwise with stirring over a period of 80 minutes. During the addition the temperature was held below 35°. When the addition was complete, the mixture was stirred for an additional 1.25 hours, after which time it was filtered, washed with water, dried over sodium sulfate, and stripped of solvent in vacuo. The residue was distilled under reduced pressure through a 10-inch Vigreux column to give 65 g. (71% of theory) of 2-chloroethyl-(2,3,4,5,7,7-hexachlorobicyclo (2.2.1)-3-heptenyl)methyl sulfite, boiling at 180° to 182° at 0.3 mm. pressure and having an index of refraction (D line) at 24° of 1.5489.

Analysis for $C_{10}H_9Cl_7O_3S$: Calculated: C 26.26%; H 1.97%; Cl 54.28%. Found: C 26.20%; H 2.12%; Cl 54.19%.

EXAMPLE III

*Preparation of adduct from hexabromocyclopentadiene and 3-buten-1-ol*

Hexabromocyclopentadiene (269.8 g., 0.5 mol.) and 3-buten-1-ol (36.0 g., 0.5 mol.) are mixed intimately in a round-bottomed flask fitted with a reflux condenser and are heated slowly without stirring until the temperature of the reaction mixture reaches 135°, where it is held for 4 hours. The product is cooled and then recrystallized from methyl alcohol to give the desired adduct.

EXAMPLE IV

*Preparation of 2-chloroethyl-2-(2,3,4,5,7,7-hexabromobicyclo (2.2.1)-3-heptenyl)ethyl sulfite*

The adduct (110.3 g., 0.2 mol.) from hexabromocyclopentadiene and 3-buten-1-ol prepared as described in Example III above is dissolved in 250 ml. of xylene in a 500 ml. flask which also contains pyridine (16 g., 0.2 mol.). In a manner similar to that described in Example II, 2-chloroethyl chlorosulfinate (32.6 g., 0.2 mol.) is added dropwise with stirring over a period or 60 minutes while the temperature of the reaction mixture is maintained below 30°. The mixture is then stirred for an additional 2 hours, filtered, washed with water, dried over sodium sulfate, stripped of solvent, and worked up to give the desired 2-chloroethyl-2-(2,3,4,5,7,7-hexabromobicyclo (2.2.1)-3-heptenyl)ethyl sulfite.

EXAMPLE V

*Preparation of adduct from tetrachlorocyclopentadiene and 4-penten-1-ol*

Tetrachchlorocyclopentadiene (101.9 g., 0.5 mol.) and 4-penten-1-ol (43.1 g., 0.5 mol.) are mixed thoroughly in a round-bottomed flask fitted with a reflux condenser. The mixture is heated slowly without stirring to a temperature of 125°, which is maintained for 4 hours. The reaction mixture is then cooled and recrystallized from methanol to give the desired adduct.

EXAMPLE VI

*Preparation of 2-bromoethyl chlorosulfinate*

Ethylene bromohydrin (62 g.) is treated with thionyl chloride (70 g.) in a manner similar to that described in Example I. Distillation of the reaction product gives the desired 2-bromoethyl chlorosulfinate.

EXAMPLE VII

*Preparation of 2-bromoethyl-3-(2,3,4,5-tetrachlorobicyclo (2.2.1)-3-heptenyl)propyl sulfite*

The addition product (58.0 g., 0.2 mol.) from tetrachlorocyclopentadiene and 4-penten-1-ol prepared as described in Example V above is added to 250 ml. of benzene and 16 g. (0.2 mol.) pyridine in a 500 ml. flask. In a manner similar to that described in Example II, 2-bromoethyl chlorosulfinate (41.5 g., 0.2 mol.) is added dropwise with stirring over a period of 85 minutes. The temperature is held below 35° during the addition. When the addition is complete, the mixture is stirred for an additional 2 hours and is then worked up to give the desired 2-bromoethyl-3-(2,3,4,5-tetrachlorobicyclo (2.2.1)-3-heptenyl)propyl sulfite.

EXAMPLE VIII

The following emulsifiable concentrate of the compound prepared in Example II is prepared by combining the ingredients in the percentage proportions by weight which are given:

|  | Percent |
|---|---|
| 2-chloroethyl-(2,3,4,5,7,7-hexachlorobicyclo (2.2.1)-3-heptenyl)-methyl sulfite | 25 |
| Atlox 1045 | 5 |
| Xylene | 70 |

"Atlox 1045" is the trade name under which an emulsifier of the polyoxyethylene sorbitol laurate type is sold. The above emulsifiable concentrate is diluted with water for use.

EXAMPLE IX

A wettable powder formulation of the product of Example IV is prepared by combining intimately the following ingredients in the given percentage proportions by weight:

|  | Percent |
|---|---|
| 2-chloroethyl-2-(2,3,4,5,7,7-hexabromobicyclo (2.2.1)-3-heptenyl)-ethyl sulfite | 35 |
| Attaclay | 60 |
| Triton X-120 | 3 |
| Tamol N | 2 |

"Attaclay" is the trade name for an aluminum magnesium silicate type diluent; "Triton X-120" is the trade name for an alkyl aryl polyether type emulsifying agent; and "Tamol N" is the trade name for a wetting agent of the type consisting of the sodium salt of a condensed aryl-sulfonic acid. The wettable powder is combined with water to the desired concentration for use.

EXAMPLE X

An emulsifiable concentrate formulation of the product of Example VII can be prepared by combining the following ingredients in the percentage proportions by weight which are given:

|  | Percent |
|---|---|
| 2-bromoethyl-3-(2,3,4,5-tetrachlorobicyclo (2.2.1)-3-heptenyl)-propyl sulfite | 30 |
| Triton X-150 | 5 |
| Benzene | 65 |

"Triton X-150" is the trade name under which an emulsifying agent of the type consisting of a blend of alkyl aryl polyether alcohols and organic sulfonates is sold. The concentrate is diluted with water to the desired concentration for use.

Obviously, many other insecticide and miticide compositions which fall within the scope of this invention can be obtained by substituting other chemical compounds for the specific compounds used as starting materials in the above examples. Thus, for example, the radical $(CH_2)_x$ can be made to contain 4 carbon atoms by using 5-hexen-1-ol instead of 4-penten-1-ol as described in Example V, whereupon the final useful product from Example VII is 2-bromoethyl-4-(2,3,4,5-tetrachlorobicyclo (2.2.1)-3-heptenyl)ethyl sulfite. Similarly, the radical $(CH_2)_z$ can be made to contain 3 or 4 carbon atoms by using 3-chloro-1-propanol or 4-chloro-1-butanol instead of ethylene chlorohydrin as described in Example I. When the resulting intermediates, namely 3-chloropropyl chlorosulfinate and 4-chlorobutyl chlorosulfinate, are reacted with the adduct from hexachlorocyclopentadiene and allyl alcohol as described in Example II, the final compositions useful as insecticides and miticides are 3-chloropropyl - (2,3,4,5,7,7-hexachlorobicyclo (2.2.1)-3-heptenyl)methyl sulfite and 4-chlorobutyl-(2,3,4,5,7,7-hexachlorobicyclo (2.2.1)-3-heptenyl)methyl sulfite, respectively. In addition, Y can be made fluorine instead of chlorine or bromine when 2-fluoroethane is used instead of ethylene chlorohydrin in Example I, whereupon the final product from Example II is 2-fluoroethyl-(2,3,4,5,7,7-hexachlorobicyclo - (2.2.1) - 3 - heptenyl)-methyl sulfite.

I claim:

1. A composition of matter having the general formula

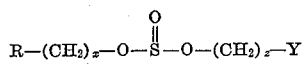

wherein R is a bicyclo(2.2.1)-3-heptenyl radical containing from 4 to 6 halogen atoms selected from the group consisting of chlorine and bromine, x is an integer from 1 to 4, z is an integer from 2 to 4, and Y is a halogen atom selected from the group consisting of chlorine, bromine and fluorine.

2. A composition of matter as described in claim 1 wherein R is a bicyclo(2.2.1)-3-heptenyl radical containing from 4 to 6 chlorine atoms, x is an integer from 1 to 4, z is an integer from 2 to 4, and Y is chlorine.

3. 2 - chloroethyl - (2,3,4,5,7,7 - hexachlorobicyclo (2.2.1)-3-heptenyl)methyl sulfite.

4. 2-chloroethyl - 2 - (2,3,4,5,7,7 - hexabromobicyclo (2.2.1)-3-heptenyl)ethyl sulfite.

5. 2-bromoethyl-3-(2,3,4,5-tetrachlorobicyclo (2.2.1)-3-heptenyl)propyl sulfite.

6. 2-fluoroethyl-(2,3,4,5,7,7-hexachlorobicyclo (2.2.1)-3-heptenyl)methyl sulfite.

7. An insecticidal and miticidal composition comprising an inert carrier, a surface-active dispersing agent, and a toxic amount of the composition of matter described in claim 1.

8. A method of combating insect and mite pests which comprises contacting said pests with a composition comprising an inert carrier, a surface-active dispersing agent, and a toxic amount of the composition of matter described in claim 1.

References Cited in the file of this patent

UNITED STATES PATENTS

| | | |
|---|---|---|
| 2,529,493 | Harris et al. | Nov. 14, 1950 |
| 2,799,685 | Frensch et al. | July 16, 1957 |

OTHER REFERENCES

Fields: J. A. C. S., vol. 76 (1954), pp. 2709–10.